(12) United States Patent
Carroll et al.

(10) Patent No.: US 10,831,906 B1
(45) Date of Patent: *Nov. 10, 2020

(54) TECHNIQUES FOR AUTOMATIC BUCKET ACCESS POLICY GENERATION

(71) Applicant: Capital One Services, LLC, McLean, VA (US)

(72) Inventors: Seth Patrick Carroll, Murphy, TX (US); Timothy Elliott, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,869

(22) Filed: Oct. 15, 2019

Related U.S. Application Data

(63) Continuation of application No. 16/446,854, filed on Jun. 20, 2019, now Pat. No. 10,482,269.

(51) Int. Cl.
*G06F 21/00* (2013.01)
*G06F 21/60* (2013.01)
*G06F 21/62* (2013.01)

(52) U.S. Cl.
CPC ............ *G06F 21/604* (2013.01); *G06F 21/62* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 10,412,170 B2 * | 9/2019 | Davis | H04L 67/1097 |
| 2009/0064332 A1 * | 3/2009 | Porras | H04L 63/1425 726/23 |
| 2011/0321118 A1 * | 12/2011 | Boldyrev | G06F 21/35 726/1 |

* cited by examiner

*Primary Examiner* — Andrew J Steinle

(57) ABSTRACT

Various embodiments are generally directed to techniques for generating updating, and/or validating one or more aspects of an access policy for a data bucket, such as based on usage data corresponding to the data bucket, for instance. Some embodiments are particularly directed to automatically generating, updating, and/or validating an access policy for a data bucket based on analysis of log data corresponding to the data bucket. In some embodiments, log data comprising access records to a data bucket may be analyzed to determine access requirements for a set of entities. In some such embodiments, the access requirements for the set of entities may then be used to generate an access policy for the data bucket.

20 Claims, 11 Drawing Sheets

```
1    {
2        "Version": "2000-11-24",
3        "Statement": [
4          {
5            "Sid": "RestrictAccess",
6            "Effect": "Deny",
7            "Entity": "$",
8            "Action": "r2:$",
9            "Resource": [
10             "hjk:qwe:r2:::hjk-fs-AEBF-offer-region",
11             "hjk:qwe:r2:::hjk-fs-AEBF-offer-region/$"
12           ],
13           "Condition" : {
14             "StringNotLike" : {
15               "hjk:arn" : [
16                 "hjk:qwe:osn::123456789:func/Health-Repair-Func",
17                 "hjk:qwe:osn::123456789:func/Func-Maintenance",
18                 "hjk:qwe:osn::123456789:func/Func-Insights",
19                 "hjk:qwe:osn::123456789:func/TransAccount-SpecialFunc-TransChecker",
20                 "hjk:qwe:osn::123456789:func/TransAccount-SpecialFunc-Admin",
21                 "hjk:qwe:osn::123456789:func/TransAccount-SpecialFunc-DataWatch",
22                 "hjk:qwe:osn::123456789:func/Defined-StoreMaintenance",
23                 "hjk:qwe:osn::123456789:func/Defined-StoreMaintenance-Operations-Minion",
24                 "hjk:qwe:osn::123456789:func/Defined-Report-Helper",
25                 "hjk:qwe:osn::123456789:func/ABC-Restricted-StorageAccess",
26                 "hjk:qwe:osn::123456789:func/ABC-Navigation-Lead",
27                 "hjk:qwe:osn::123456789:func/XY_PL_AEF_HJK_AEBF_Read_Only_Production",
28                 "hjk:qwe:osn::123456789:func/Storage-configuration-func",
29                 "hjk:qwe:osn::123456789:user/PONML-DataDeposit",
30                 "hjk:qwe:osn::987654321:func/ABC-PA_Production Automation",
31                 "hjk:qwe:yuy::123456789:applied-func/CBO-Correction-Func/AssumeFuncSession",
32                 "hjk:qwe:yuy::123456789:applied-func/AEBF-Prod-SpecialFunc-Gap-Maintenance/i-$",
33                 "hjk:qwe:yuy::123456789:applied-func/TransAccount-SpecialFunc-Insight/Insights",
34                 "hjk:qwe:yuy::123456789:applied-func/TransAccount-SpecialFunc-Cross_Checker/r2-jimipam",
35                 "hjk:qwe:yuy::123456789:applied-func/TransAccount-SpecialFunc-DataRepairs_Admin/$",
36                 "hjk:qwe:yuy::123456789:applied-func/TransAccount-SpecialFunc-Data/DataHJKIntegration",
37                 "hjk:qwe:yuy::123456789:applied-func/Defined-StorMaintenance-Operations/SM@enterprise-procedures",
38                 "hjk:qwe:yuy::123456789:applied-func/Defined-StoreMaintenance/DataMaintenance$",
39                 "hjk:qwe:yuy::123456789:applied-func/Defined-StoreMaintenance/Maintenance-$",
40                 "hjk:qwe:yuy::123456789:applied-func/Defined-StoreMaintenance/r2-jimipam",
41                 "hjk:qwe:yuy::123456789:applied-func/Defined-Report-Helper/StoreMaintenance$",
42                 "hjk:qwe:yuy::123456789:applied-func/ABC-Restricted-Data-Access/$",
43                 "hjk:qwe:yuy::123456789:applied-func/ABC-Navigation-Lead/$",
44                 "hjk:qwe:yuy::123456789:applied-func/GR_GG_AEF_HJK_AEBF_Prod_ReadOnly/JKE953",
45                 "hjk:qwe:yuy::123456789:applied-func/GR_GG_AEF_HJK_AEBF_Prod_ReadOnly/jke953",
46                 "hjk:qwe:yuy::123456789:applied-func/configuration-storage-func/Configuration-Data",
47                 "hjk:qwe:yuy::987654321:applied-func/ABC-PA_Production_Automation/k-$"
48               ]
49             }
50           }
51         },
```

```
52    {
53        "Sid" : "RestrictWriteAccess",
54        "Effect" : "Deny",
55        "Entity" : "S",
56        "Action" : [
57            "r2 : Delete$",
58            "r2 : Put$"
59        ],
60        "Resource" : [
61            "hjk:qwe:r2: : :hjk-fs-AEBF-offer-region",
62            "hjk:qwe:r2: : :hjk-fs-AEBF-offer-region/$"
63        ],
64        "Condition": {
65            "StringNotLike": {
66                "hjk:arn": [
67                    "hjk:qwe:osn: :123456789:func/Defined-StoreMaintenance",
68                    "hjk:qwe:osn: :123456789:func/ABC-Restricted-StorageAccess",
69                    "hjk:qwe:osn: :123456789:func/ABC-Navigation-Lead",
70                    "hjk:qwe:osn: :987654321:func/ABC-PA_ProductionAutomation",
71                    "hjk:qwe:yuy: :123456789:applied-func/Defined-StoreMaintenance/StoreMaintenance$",
72                    "hjk:qwe:yuy: :123456789:applied-func/Defined-StoreMaintenance/Maintenance-$",
73                    "hjk:qwe:yuy: :123456789:applied-func/ABC-Restricted-StorageAccess/$",
74                    "hjk:qwe:yuy: :123456789:applied-func/ABC-Navigation-Lead/$",
75                    "hjk:qwe:yuy: :987654321:apllied-func/ABC-PA_ProductionAutomation/g-$"
76                ]
77            }
78        }
79    }, 80    {
81        "Sid": "SpecificAllowforTransAccountReadAccess",
82        "Effect": "Allow",
83        "Entity": {
84            "HJK": [
85                "hjk:qwe:osn: :987654321:func/ABC-PA_ProductionAutomation"
86            ]
87        },
88        "Action": [
89            "r2:Get$",
90            "r2:List$"
91        ],
92        "Resource": [
93            "hjk:qwe:r2: : :hjk-fs-AEBF-offer-region",
94            "hjk:qwe:r2: : :hjk-fs-AEBF-offer-region/$"
95        ]
96    },
```

```
97    {
98       "Sid": "SpecificAllowforTransAccountWriteAccess",
99       "Effect": "Allow",
100      "Entity": {
101        "HJK": [
102          "hjk:qwe:osn: :987654321:func/ABC-PA_ProductionAutomation"
103        ]
104      },
105      "Action": [
106        "r2:Put$"
107      ],
108      "Resource": [
109        "hjk:qwe:r2: : :hjk-fs-AEBF-offer-region",
110        "hjk:qwe:r2: : :hjk-fs-AEBF-offer-region/$"
111      ],
112      "Condition": {
113        "StringEquals": {
114          "r2:z-kuy-egt": "full-data-bucket-control"
115        }
116      }
117    },
118    {
119      "Sid": "SpecificAllowforTransAccountDeleteAccess",
120      "Effect":   "Allow",
121      "Entity":   {
122        "HJK": [
123          "hjk:qwe:osn: :987654321:func/ABC-PA_ProductionAutomation"
124        ]
125      },
126      "Action":  [
127        "r2:Delete$"
128      ],
129      "Resource": [
130        "hjk:qwe:r2: : :hjk-fs-AEBF-offer-region",
131        "hjk:qwe:r2: : :hjk-fs-AEBF-offer-region/$"
132      ]
133    }
134   ]
135  }
```

| Identifying log data for a data bucket, the log data comprising access records for the data bucket and the data bucket comprising enterprise information<br>562 |

↓

| Applying one or more filter algorithms to the log data to determine a set of entities that have accessed the data bucket<br>564 |

↓

| Determining a set of one or more access characteristics for each entity in the set of entities based on the log data, each set of one or more access characteristics to include one or more access types to the data bucket requested by a corresponding entity<br>566 |

↓

| Analyzing the set of one or more access characteristics for each entity in the set of entities to determine a set of access requirements for each entity in the set of entities<br>568 |

↓

| Creating first and second subsets of the set of entities based on the set of access requirements for each entity in the set of entities, the first subset of the set of entities to include one or more entities that require read-only access to the data bucket and the second subset of the set of entities to include one or more entities that require read-write access to the data bucket<br>570 |

↓

| Generating an access policy for the data bucket based on the first and second subsets of the set of entities, the access policy to allow read-only access to the data bucket by the first subset of the set of entities, allow read-write access to the data bucket by the second subset of the set of entities, and prevent access to the data bucket by entities absent from the first and second subsets of the set of entities<br>572 |

700

TECHNIQUES FOR AUTOMATIC BUCKET ACCESS POLICY GENERATION

BACKGROUND

In computing, a data bucket may refer to a container for holding or storing data. For instance, information stored in cloud storage, such as objects, may be located in a data bucket. Data buckets can be used to organize and/or control access to data. However, generally, data buckets may not be nested, unlike directories and folders. Oftentimes, data bucket policies refer to principles and/or rules used to control one or more aspects of a data bucket, such as access to the data bucket. For example, a data bucket policy may include a list of users not allowed to access a corresponding data bucket.

RELATED APPLICATIONS

This application is a continuation of U.S. patent application Ser. No. 16/446,854, titled "TECHNIQUES FOR AUTOMATIC BUCKET ACCESS POLICY GENERATION" filed on Jun. 20, 2019. The contents of the aforementioned application are incorporated herein by reference.

BRIEF DESCRIPTION OF THE DRAWINGS

FIGS. 4A-4C illustrate an exemplary access policy according to one or more embodiments described herein.

FIGS. 5A-5C illustrate exemplary logic flows according to one or more embodiments described here.

DETAILED DESCRIPTION

Figure 1:
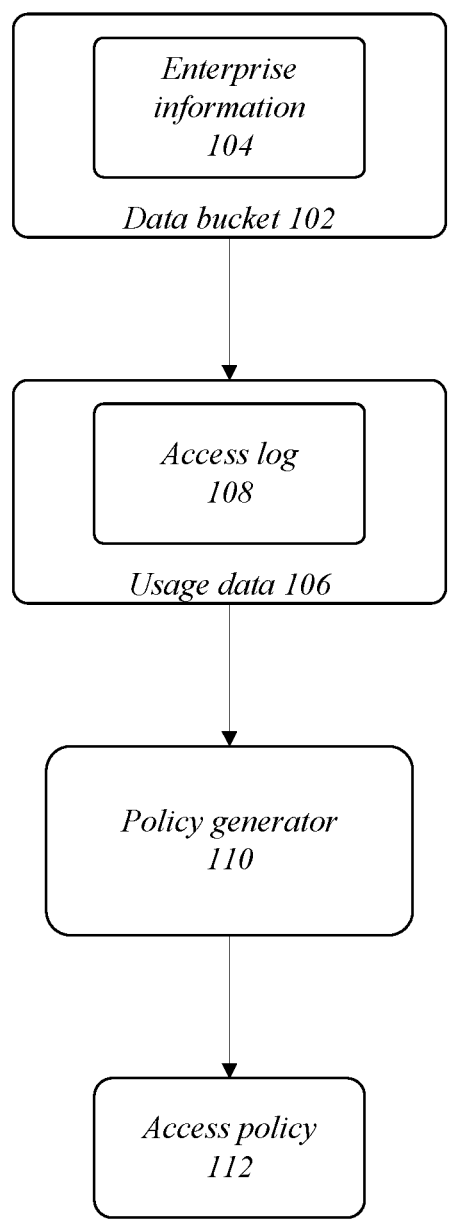
FIG. 1 illustrates an exemplary operating environment according to one or more embodiments described herein.

Various embodiments are generally directed to techniques for generating, updating, and/or validating one or more aspects of an access policy for a data bucket, such as based on usage data corresponding to the data bucket, for instance. Some embodiments are particularly directed to automatically generating, updating, and/or validating an access policy for a data bucket based on analysis of log data corresponding to the data bucket. In some embodiments, log data comprising access records to a data bucket may be analyzed to determine access requirements for a set of entities. In some such embodiments, the access requirements for the set of entities may then be used to generate an access policy for the data bucket. These and other embodiments are described and claimed.

In one embodiment, for example, an apparatus may comprise a processor and memory comprising instructions that when executed by the processor cause the processor to perform one or more of the following. In various embodiments, the processor may apply one or more filter algorithms to log data to determine a set of entities that have accessed a data bucket. In various such embodiments, the log data may comprise access records for the data bucket and the data bucket may include enterprise information. In several embodiments, the processor may identify a set of one or more access characteristics for each entity in the set of entities based on the log data. In several such embodiments, each set of one or more access characteristics may include one or more access types to the data bucket requested by a corresponding entity from the set of entities. In some embodiments, the processor may analyze the set of one or more access characteristics for each entity in the set of entities to determine a set of access requirements for each entity in the set of entities.

In many embodiments, the processor may create first and second subsets of the set of entities based on the set of access requirements for each entity in the set of entities. In many such embodiments, the first subset of the set of entities may include one or more entities that require read-only access to the data bucket and the second subset of the set of entities may include one or more entities that require read-write access to the data bucket. In one or more embodiments, the processor may generate an access policy for the data bucket based on the first and second subsets of the set of entities. In one or more such embodiments, the access policy may allow read-only access to the data bucket by the first subset of the set of entities, allow read-write access to the data bucket by the second subset of the set of entities, and prevent access to the data bucket by entities absent from the first and second subsets of the set of entities.

Some challenges facing data buckets include keeping information in the data buckets secure without inhibiting access to the information by a minimal set of approved entities, such as authorized employees, that may frequently change. For example, the minimal set of approved entities may frequently change due to entities moving to different teams or roles within an enterprise, roles/responsibilities changing within an enterprise, and entities leaving an enterprise. Further, thousands or millions of data buckets may be created, utilized, and/or accessed by independent teams with different entities across an enterprise. These challenges may result in manually intensive operations being required to determine a minimal set of entities that need access to a data bucket. For example, preventing unauthorized entities from accessing a data bucket while still allowing authorized entities to access the data bucket may require the creation of customized access policies for each data bucket that need to be updated regularly.

Adding further complexity, different entities may require different types of access to a data bucket. For instance, some entities may need read-only access to a data bucket while other entities need read-write access to the data bucket. However, in order to provide robust security to information in data buckets, access above and beyond what is required should be prevented. Therefore, access policies should only allow required types of access to information in data buckets. These and other factors may result in unsecure data buckets and outdated access policies, resulting in data buckets and/or access policies with reduced applicability and poor adaptability. Such limitations can drastically reduce the security of data buckets and feasibility of access policy generation, contributing to lost economies of scale, excessive resource waste, and inefficient systems, devices, and techniques.

Various embodiments described herein include a policy generator to automatically generate access policies for data buckets in an efficient, effective, and scalable manner. Many embodiments may analyze usage data, such as an access log, to determine access requirements of one or more entities to a data mucket. Many such embodiments may utilize the access requirements of the one or more entities to the data bucket to generate a data bucket with limited or no oversight, enabling improved resource utilization. Several embodiments may include new and useful ways to extract and aggregate a list of entities from access logs and apply that to a policy template. In many embodiments, a policy template may be modified to fit any particular use case. Various embodiments may create access policies that provide a minimum required set of entities with the minimum required access to a data bucket, resulting in improved security and fewer opportunities for malicious actors. In some embodiments, filter algorithms may be applied to access records in log data associated with a data bucket used to accurately and automatically resolve permutations of accesses to the data bucket by a common entity and/or remove noise from the log data.

One or more techniques described herein may facilitate generating, updating, and/or validating access policies in an optimized, accurate, and tailored manner, leading to enhanced access policy creation and management, as well as improved protections for information stored in data buckets. In these and other ways, components/techniques described here may identify methods to increase efficiency, decrease performance costs, decrease computational cost, and/or reduce resource requirements to generate and maintain access policies for data buckets in an accurate, reactive, efficient, dynamic, and scalable manner, resulting in several technical effects and advantages over conventional computer technology, including increased capabilities and improved adaptability. In various embodiments, one or more of the aspects, techniques, and/or components described herein may be implemented in a practical application via one or more computing devices, and thereby provide additional and useful functionality to the one or more computing devices, resulting in more capable, better functioning, and improved computing devices. Further, one or more of the aspects, techniques, and/or components described herein may be utilized to improve the technical fields of data security and access control.

In several embodiments, components described herein may provide specific and particular manners for automatically generating, updating, and/or validating access policies to optimize utilization and/or security of data buckets. In several such embodiments, the specific and particular manners of enabling identification of relationships between data objects may include one or more of utilizing access logs and/or access characteristics to automatically generate access policies, such as through application of one or more filter algorithms to access records in log data. In many embodiments, one or more of the components described herein may be implemented as a set of rules that improve computer-related technology by allowing a function not previously performable by a computer that enables an improved technological result to be achieved. For example, the function allowed may include one or more aspects of generating, updating, and/or validating access policies.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary operating environment 100 according to one or more embodiments described herein. Operating environment 100 may include a data bucket 102 with enterprise information 104, usage data 106 including an access log 108, a policy generator 110, and an access policy 112. In one or more embodiments described herein, the usage data 106 comprising access log 108 corresponding to data bucket 102 comprising enterprise information 104 may be utilized by policy generator 110 to create an access policy 112 for the data bucket 102. Embodiments are not limited in this context.

In several embodiments, data bucket 102 may be a repository for enterprise information 104. For example, company documents may be stored in data bucket 102. In some embodiments, data bucket 102 may include a cloud storage resource (e.g., an AWS S3 bucket, Azure Blob storage, Google Cloud Storage etc.). In various embodiments, the data bucket 102 may need to be accessed by various entities within or associated with an enterprise, such as employees of a company or company devices. However, in various such embodiments, access to the data bucket 102 by unauthorized entities may be restricted. For example, employees without appropriate qualifications and non-employee entities, such as malicious actors, may be prevented from accessing data bucket 102.

Accordingly, in one or more embodiments, access to the data bucket 102 may be controlled according to access policy 112. In some embodiments, access policy 112 may include one or more entities that are allowed to access data bucket 102. In some such embodiments, access policy 112 may include types of accesses allowed by each of the one or more entities that are allowed to access data bucket 102. For example, a first portion of entities that are allowed to access data bucket 102 may be allowed read and write access to enterprise information 104 in data bucket 102 and a second portion of entities that are allowed to access data bucket 102 may be allowed read-only access to enterprise information 104 in data bucket 102. In various embodiments, access policy 112 may include one or more whitelists of entities allowed to access data bucket 102. For instance, a first whitelist may include entities with write access to data bucket 102 while a second whitelist may include entities with read access to data bucket 102. In such instances, some entities may be included in the first and second whitelists.

In some embodiments, access policy 112 may grant entities with different levels of access to different portions of enterprise information 104. For example, an entity may have read access to all enterprise information 104 in data bucket 102 but only write access to portions enterprise information 104 created by the entity. In another example, an entity may have read access to only a portion of enterprise information 104. In such other examples, the portion of enterprise information 104 that the entity does not have read access to may be hidden from or invisible to the entity. In some embodiments, administrator-level or user-level permissions may be granted to entities based on their role in the enterprise and/or association with the data bucket 102. In various embodiments, download and/or upload permissions may be granted to the data bucket 102. In some embodiments, any type/level of access, or combination thereof, may be granted via access policy 112 without departing from the scope of this disclosure.

In many embodiments, policy generator 110 may determine, generate, create, update, and/or validate the access policy 112 based on usage data 106. In one or more embodiments described herein, reference made to determining, generating, creating, updating, revising, validating, and the like may implicitly include other referenced actions without departing from the scope of this disclosure. For example, generating an access policy may implicitly include one or more of determining, creating, updating, revising, validating, and the like. In various embodiments, usage data 106 may refer to any data associated with access to data within data bucket 102. For example, usage data 106 may include metadata and/or log data. In the illustrated embodiment, policy generator 110 may utilize the access log 108 in usage data 106 to create, update, and/or validate access policy 112. In some embodiments, usage data 106 may be stored in data bucket 102. In several embodiments, usage data 106 may be stored separate from data bucket 102, such as in a log file stored in another data bucket.

In various embodiments, policy generator 110 may generate access policy 112 based on a portion of usage data 106. For instance, policy generator 110 may generate access policy 112 may on usage data 106 associated with a predefined and/or user defined range of dates. In some embodiments, policy generator 110 may periodically update the access policy 112 based on additional or new usage data. For instance, policy generator 110 may update the access policy every month. In many embodiments, policy generator 110 may update access policy 112 upon a request or demand, such as from a user or an application. In various embodiments access policy 112 may be a proposed access policy that must be manually approved. In some embodiments, access policy 112 may be uploaded or submitted to a policy enforcer that allows or blocks accesses to data bucket 102 based on the access policy 112.

Figure 2:
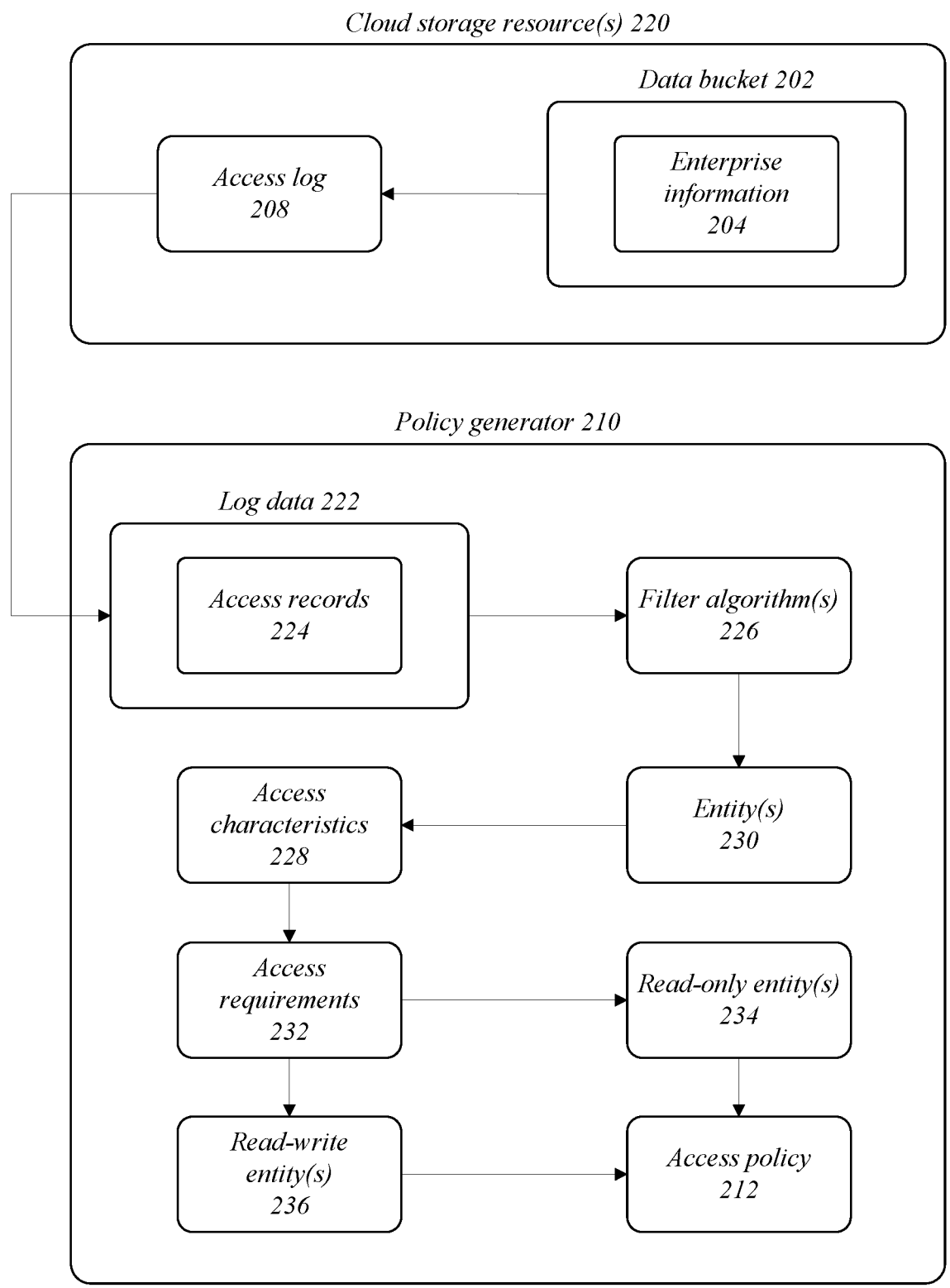
FIG. 2 illustrates various aspects of generating an access policy according to one or more embodiments described herein.

FIG. 2 illustrates various aspects of generating access policy 212 in environment 200 according to one or more embodiments described herein. In various embodiments, one or more components of environment 200 may be the same or similar to one or more components of environment 100. For instance, policy generator 110 may be the same or similar to policy generator 210 and/or access policy 212 may be the same or similar to access policy 112. The illustrated embodiment of environment 200 may include one or more cloud storage resources 220 and policy generator 210. The one or more cloud storage resources 220 may include data bucket 202 with enterprise information 204 and access log 208. Policy generator 210 may include and/or determine log data 222 with a set of one or more access records 224, a set of one or more filter algorithms 226, a set of one or more entities 230, a set of one or more access characteristics 228, a set of one or more access requirements 232, a set of one or more read-only entities 234, a set of one or more read-write entities 236, and access policy 212. Embodiments are not limited in this context.

In one or more embodiments, cloud storage resources 220 may include remote data storage. In various embodiments, cloud storage resources 220 may refer to data storage in which the enterprise does not have physical control over the underlying hardware for the data storage. In many embodiments, cloud storage resources 220 may include commoditized data storage acquired by an enterprise from a third-party vendor. In some embodiments, policy generator 210 may create access policies for data buckets not comprised in cloud storage resources. For example, policy generator 210 may create access policies for data buckets stored locally, such as in storage resources for which the enterprise has physical control over the underlying hardware for the data storage. In several embodiments, access log 208 may be stored separately from data bucket 202. For example, access log 208 may be stored locally and data bucket 202 may be stored in cloud storage resources 220.

In various embodiments, the one or more cloud storage resources 220 may include a plurality of data buckets. In various such embodiments, policy generator 210 may generate an access policy for each of the plurality of data buckets. In other such embodiments, policy generator 210 may generate an access policy for select data buckets in cloud storage resources 220. In some embodiments, policy generator 210 may generate access policies for each data bucket that has a corresponding access log. In the illustrated embodiment, cloud storage resources 220 include data bucket 202 with enterprise information 204 and access log 208. In various embodiments, the access log 208 may include a record of changes and access to data bucket 202.

In many embodiments, policy generator 210 may utilize access log 208 to identify log data 222 comprising access records 224. In some embodiments, policy generator 210 may retrieve access log 208 from their storage locations (e.g., cloud storage resources 220). In other embodiments, access log 208 may be provided to policy generator 210 as input. In one or more embodiments, policy generator 210 may apply one or more filter algorithms 226 to the access records 224 of log data 222. In various embodiments, the filter algorithms 226 may include filter algorithms for different purposes. For example, some filter algorithms may be used to remove noise from log data 222. In some such examples, a filter algorithm may be used to identify log data 222 comprising access records 224 from access log 208. In the illustrated embodiment, one or more filter algorithms 226 may be utilized by policy generator 210 to identify a set of entities 230 that have accessed data bucket 202. For example, one or more of the filter algorithms 226 may be used to resolve permutations of accesses to the data bucket 202 by a common entity. In various embodiments, one or more of the filter algorithms 226 may parse access log 208 and/or log data 222 and store the results, such as in a document database. In various such embodiments, this may enable querying and/or aggregation of the log data 222 to derive the list of entities 230. These aspects of the disclosure will be described in more detail below, such as with respect to FIG. 3.

In one or more embodiments, the set of entities 230 may include or refer to one or more of enterprise employees, enterprise devices, enterprise contractors, login credentials, an employee identifier, or the like that have accessed, or been used to access, data bucket 202. In various embodiments, policy generator 210 may determine the access characteristics 228 of the set of entities 230. In various such embodiments, policy generator 210 may determine a set of access characteristics for each entity in the set of entities 230. In many embodiments, policy generator 210 may utilize the access characteristics 228 to determine one or more access requirements 232 for the set of entities. For instance, policy generator 210 may determine a set of access requirements for each entity in the set of entities 230. These aspects of the disclosure will be described in more detail below, such as with respect to FIG. 3.

In many embodiments, policy generator 210 may determine a set of one or more read-only entities 234 and a set of read-write entities 236 based on the access requirements 232. In several embodiments, each entity in the set of entities 230 may be placed in one of the set of read-only entities 234 and the set of read-write entities 236. In some embodiments, only entities that are authenticated or verified by policy generator 210 may be placed in one of the set of read-only entities 234 and the set of read-write entities 236. In various embodiments, policy generator 210 may create access policy 212 based on the set of read-only entities 234 and the set of read-write entities 236.

Figure 3:
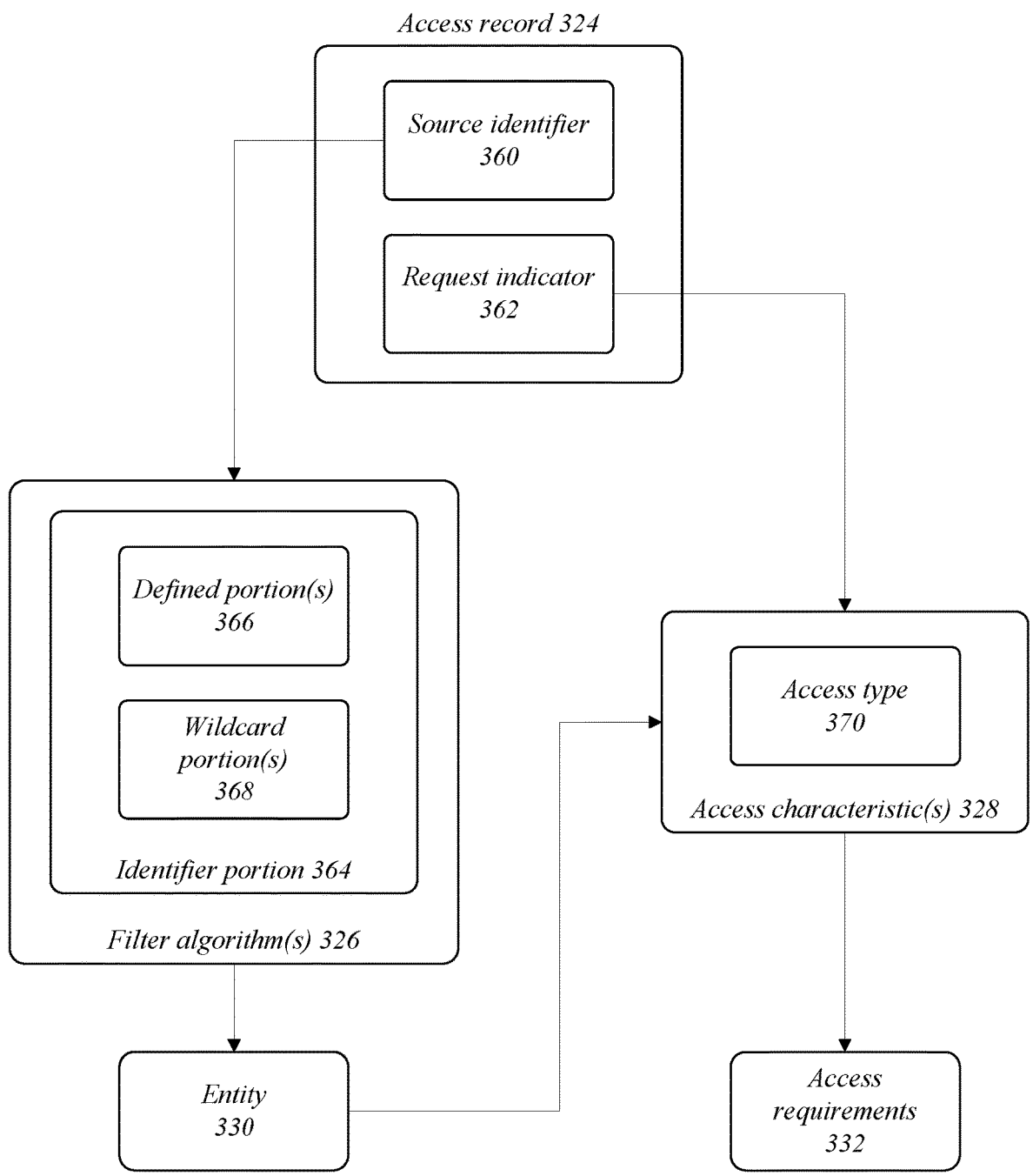
FIG. 3 illustrates various aspects of determining access requirements according to one or more embodiments described herein.

FIG. 3 illustrates various aspects of determining access requirements 332 in environment 300 according to one or more embodiments described herein. In various embodiments, one or more components of environment 300 may be the same or similar to one or more components of environment 100 or environment 200. For instance, access record 324 may include an access record from the set of access records 224 and/or access requirements 332 may be the same or similar to access requirements 232. The illustrated embodiment of environment 300 may include access record 324, one or more filter algorithms 326, one or more access characteristics 328, and a set of one or more access requirements 332. In one or more embodiments described herein, one or more filter algorithms 326 may be applied to access record 324 to associate the entity 330 with the access record 324 as part of determining the set of one or more access requirements 332 for the entity 330. Embodiments are not limited in this context.

In several embodiments, one or more aspects of determining access requirements 332 for entity 330 may be performed by policy generator 110 or policy generator 210. In many embodiments, access record 324 may be associated with an access to a data bucket, such as data bucket 202. In environment 300, access record 324 may include source identifier 360 and request indicator 362. In various embodiments, source identifier 360 may include an indication of the source, such as an entity, of the access that is memorialized by access record 324. In some embodiments, source identifier 360 may include a string of values, such as a user identification or an internet protocol (IP) address. In many embodiments, request indicator 362 may identify the type of access to the data bucket, such as a read access or a write access.

In many embodiments, one or more filter algorithms 326 may be applied to the source identifier 360 portion of access record 324 to identify entity 330 as associated with access record 324. In various embodiments, the one or more filter algorithms 326 may be applied to the access record 324 as a whole. In some embodiments, the one or more filter algorithms 326 may include or refer to one or more filters. In the illustrated embodiments, each of the one or more filter algorithms may include an identifier portion 364 with one or more defined portions 366 and one or more wildcard portions 368. In various embodiments, the one or more defined portions 366 may include a set of one or more indications of entity 330. In many embodiments, one or more of the filter algorithms 326 may parse access record 324 and store the results, such as in a document database. In various such embodiments, this may be repeated for each access record 324 in log data 222 to enable querying and/or aggregation of the log data 222 such as for deriving the set of entities 230.

In various embodiments, the one or more defined portions 366 may be used to resolve permutations of access records that correspond to a common entity. For example, as previously mentioned, source identifier 360 may include an IP address. However, in some embodiments, a single entity may correspond to multiple IP addresses. Accordingly, the one or more defined portions 366 may be utilized to determine that multiple access records associated with different IP addresses correspond to a common entity.

In many embodiments, the one or more wildcard portions 368 may allow extraneous characters to be filtered out of access records. In several embodiments, the one or more wildcard portions 368 may enable control over or apply structure to how defined portions 366 are searched/identified in access record 324. For instance, a defined portion may be sandwiched between two wildcard portions. Accordingly, the defined portion will only be identified if one or more extraneous characters both proceed and follow the defined portion. In some embodiments, the number of characters in a wildcard portion may be defined. For example, a wildcard portion may be defined as having five characters. In another instance, a wildcard portion may be defined as having five or fewer characters. Conversely, a wildcard portion may be defined as having five or more characters. In various embodiments, one or more aspects described in conjunction with determining access requirement 332 and/or generating an access policy may be incorporated in the access policy itself. For example, wildcard portions may be included in access policies to ensure an entity can access a data bucket regardless of their current IP address. These aspects of the disclosure will be described in more detail below, such as with respect to FIGS. 4A-4C.

In some embodiments, once the entity 330 associated with the access record 324 is identified, one or more access characteristics 328 may be determined for the entity 330 based on access record 324. For example, request indicator 362 may indicate that access record 324 corresponds to a read access to a data bucket. Accordingly, access type 370 comprising read access to the data bucket may be generated as one of the access characteristics 328. In many embodiments, one or more access requirements 332 may be determined for entity 330 based on the one or more access characteristics 328. For instance, access requirements 332 may include read access to a data bucket associated with access record 324.

FIGS. 4A-4C illustrate an exemplary access policy 412 in environment 400 according to one or more embodiments described herein. In many embodiments, access policy 412 may be created by policy generator 110. In one or more embodiments described herein, access policy 412 may be automatically generated by policy generator 110 based on usage data 106. In various embodiments, access policy 412 may be utilized by a policy enforcer to control access to enterprise information within a data bucket. As previously mentioned, embodiments may apply a list of entities to a policy template modified to fit a particular use case. In several embodiments, FIGS. 4A-4C may illustrate one such example based on a restricted access pattern. The illustrated embodiment includes numbered lines 1-135 to facilitate description of the access policy 412. Embodiments are not limited in this context.

Generally, access policy 412 may include one or more entities (which are extracted and aggregated from the access logs) that are allowed to access to a corresponding data bucket and types of access allowed by each of the one or more entities. In several embodiments, access policy 412 may include a number of statement clauses, sections, and/or listings. In many embodiments, each statement clause may include multiple sections including one statement identifier (e.g., line 5), an effect (e.g., line 6), an entity (e.g., line 7), an action (e.g., line 8), a resource (e.g., lines 9-11), and a condition (e.g., line 13-14). Further, each of the sections may include multiple entries, such as the resources in lines 9-11.

In some embodiments, a statement identifier may provide a way to quickly identify the section when setting or modifying rules in a policy. In various embodiments, an effect may include the intended access control of the statement clause. For example, the effect may allow the stated permissions or deny the stated permissions. In many embodiments, resources are what a rule and/or policy will be applied to. In many such embodiments, the resources may include one or more of a data bucket, a set of data buckets, data objects in a data bucket, and a subset of data objects in a data bucket. In various embodiments, entities may include a list of entities that the rules and/or policy applies or a list of entities that are excluded from the rules and/or policy. As will be appreciated, listings may be included in a statement clause. In many embodiments, the entities may be the same or similar to one or more of the entities 230 and/or entity 330.

In some embodiments, conditions may include factors that will restrict the scope of a rule and/or policy. For example, a condition may contain a list of IP address ranges and the rule and/or policy may only apply if the IP address from which an action request is made is in (or not in) that list. In several embodiments, actions may include a set of operations that entities may (or may not) be allowed to perform against the resources as long as the conditions have been met. In one or more embodiments, actions may take the form of "service namespace:action" (e.g., s3:GetObject) and the action may contain a wildcard (e.g., s3:Get*). In the illustrated embodiment, the effect (e.g., line 6) may be applied to the action (e.g., line 8) by the entity (e.g., line 7) with respect to the resources (e.g., lines 9-11) when the condition (e.g., lines 13-14) is met with respect to the listing (e.g., lines 15-47). In many embodiments, condition clauses may be optional.

In some embodiments, access policy 412 may include a list of allowed entities for each type of access. In access policy 412, lines 4-51 may include a listing of entities that are allowed read access to the corresponding data buckets. Accordingly, access (line 8) to the corresponding data buckets (line 10-11) is denied (line 6) when the access is made by an entity that does not correspond to a string (line 14) identified in lines 15-47. Also, in access policy 412, lines 52-96 may include a listing of entities that are allowed write access to the corresponding data bucket. Accordingly, write access to the corresponding data bucket is denied (line 54) when the access is made by an entity that does not correspond to a string (line 65) identified in lines 66-75.

Typically, a restricted access pattern policy, such as access policy 412, may deny all access to one or more data buckets except for entities listed in the condition. However, as previously mentioned, other types of access policies may be used without departing from the scope of this disclosure. For example, an access policy may allow access to one or more data buckets except for entities listed in the condition. In some embodiments, one or more access policies described herein, such as access policy 412, may override more generic and/or default access policies. For instance, a cloud service provider may, by default, allow other users and roles within the same account to access a data bucket if they have broadly provisioned permissions. In such instances, one or more access policies described herein may override the default access policy.

Figure 5A:
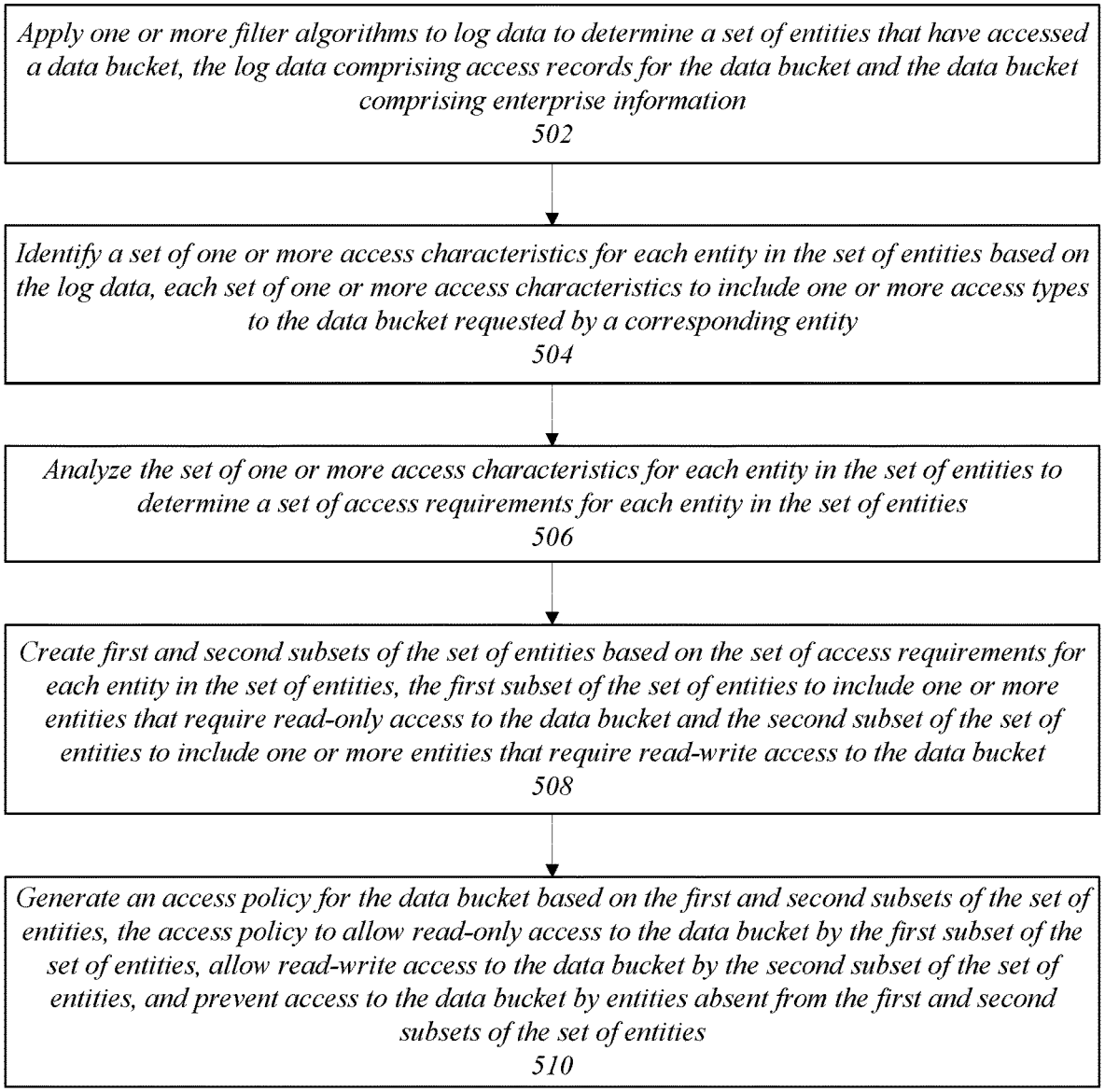

FIG. 5A illustrates one embodiment of a logic flow 500A, which may be representative of operations that may be executed in various embodiments in conjunction with techniques for generating updating, and/or validating one or more aspects of an access policy for a data bucket. The logic flow 500A may be representative of some or all of the operations that may be executed by one or more components/devices/environments described herein, such as policy generator 110, filter algorithm(s) 226, and/or filter algorithm(s) 326. The embodiments are not limited in this context.

In the illustrated embodiments, logic flow 500A may begin at block 502. At bock 502 "apply one or more filter algorithms to log data to determine a set of entities that have accessed a data bucket, the log data comprising access records for the data bucket and the data bucket comprising enterprise information" one or more filter algorithms may be applied to log data to determine a set of entities that have accessed a data bucket. Further, the log data may include access records for the data bucket and the data bucket may include enterprise information. For example, policy generator 210 may apply one or more filter algorithms 226 to log data 222 to determine the set of entities 230.

Proceeding to block 504 "identify a set of one or more access characteristics for each entity in the set of entities based on the log data, each set of one or more access characteristics to include one or more access types to the data bucket requested by a corresponding entity" a set of one or more access characteristics for each entity in the set of entities may be identified based on the log data. Further, each set of access characteristics may include one or more access types to the data bucket requested by a corresponding entity. For instance, policy generator 110 may identify a set of one or more access characteristics 328 comprising one or more access types 370 for entity 330. In some such instances, entity 330 may be included in the set of entities 230 and policy generator 110 may repeat this process for each entity in the set of entities 230.

Continuing to block 506 "analyze the set of one or more access characteristics for each entity in the set of entities to determine a set of access requirements for each entity in the set of entities" the set of one or more access characteristics for each entity in the set of entities may be analyzed to determine a set of access requirements for each entity in the set of entities. For example, policy generator 110 may analyze the set of one or more access characteristics 328 comprising one or more access types 370 for entity 330 to determine the set of access requirements 332. In some such examples, entity 330 may be included in the set of entities 230 and policy generator 110 may repeat this process for each entity in the set of entities 230.

At block 508 "create first and second subsets of the set of entities based on the set of access requirements for each entity in the set of entities, the first subset of the set of entities to include one or more entities that require read-only access to the data bucket and the second subset of the set of entities to include one or more entities that require read-write access to the data bucket" first and second subsets of the set of entities may be created based on the set of access requirements for each entity in the set of entities. Further, the first subset of the set of entities may include one or more entities that require read-only access to the data bucket and the second subset of the set of entities may include one or more entities that require read-write access to the data bucket. For instance, policy generator 210 may create a first subset of entities 230 comprising read-only entities 234 and a second subset of entities 230 comprising read-write entities 236.

Proceeding to block 510 "generate an access policy for the data bucket based on the first and second subsets of the set of entities, the access policy to allow read-only access to the data bucket by the first subset of the set of entities, allow read-write access to the data bucket by the second subset of the set of entities, and prevent access to the data bucket by entities absent from the first and second subsets of the set of entities" an access policy for the data bucket may be generated based on the first and second subsets of the set of entities. For example, policy generator 210 may generate access policy 212 for data bucket 202 based on read-only entities 234 and read-write entities 236. In some such examples, access policy 212 may allow read-only access to data bucket 202 for read-only entities 234, read-write access to data bucket 202 for read-write entities 236, and prevent access to the data bucket 202 by entities absent from the read-only entities 234 and read-write entities 236.

Figure 5B:
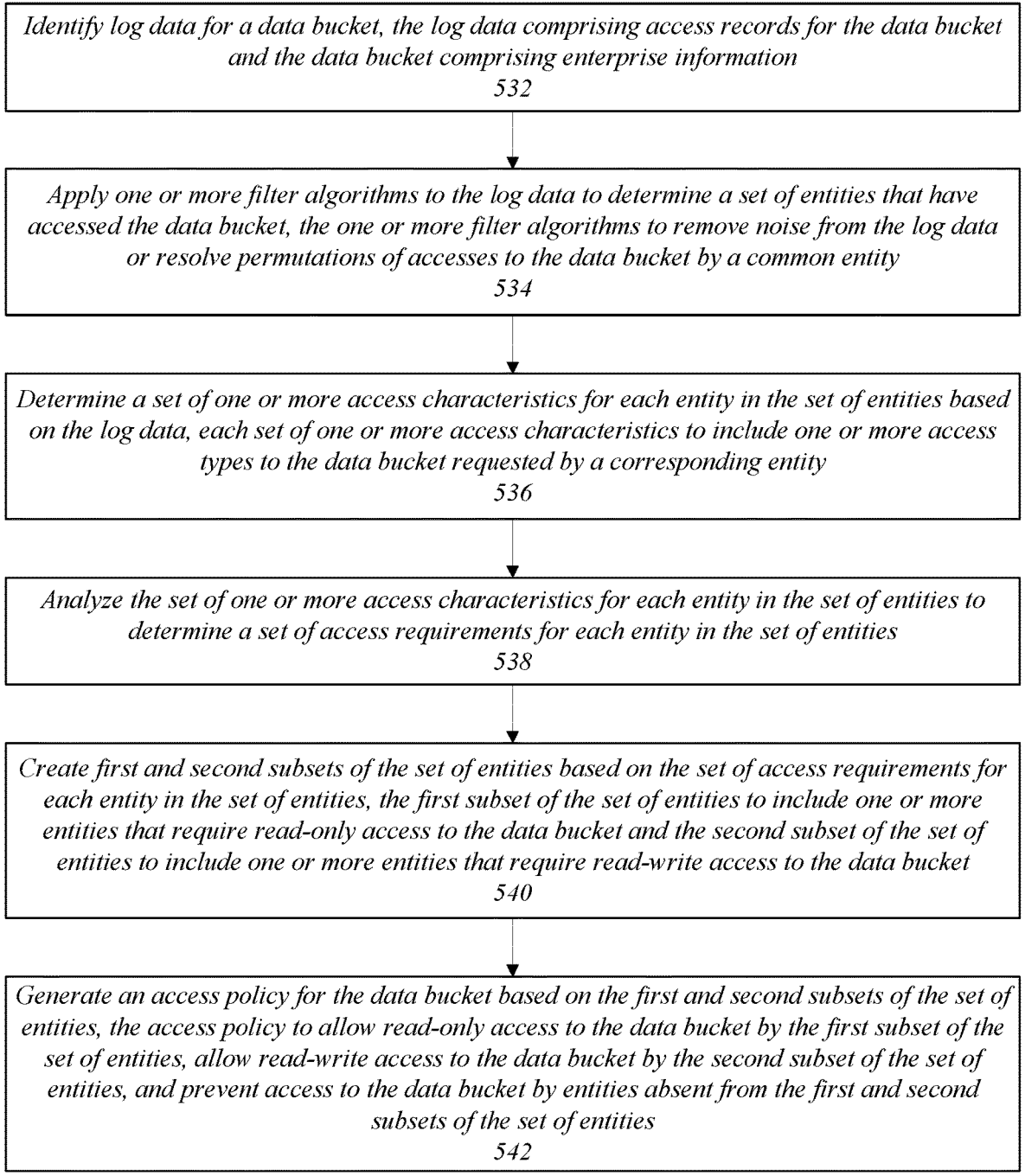

FIG. 5B illustrates one embodiment of a logic flow 500B, which may be representative of operations that may be executed in various embodiments in conjunction with techniques for generating updating, and/or validating one or more aspects of an access policy for a data bucket. The logic flow 500B may be representative of some or all of the operations that may be executed by one or more components/devices/environments described herein, such as policy generator 110, filter algorithm(s) 226, and/or filter algorithm(s) 326. The embodiments are not limited in this context.

In the illustrated embodiments, logic flow 500B may begin at block 532. At block 532 "identify log data for a data bucket, the log data comprising access records for the data bucket and the data bucket comprising enterprise information" log data for a data bucket comprising enterprise information may be identified that includes access records for the data bucket. For example, policy generator 210 may identify log data 222 comprising access records 224 for data bucket 202 with enterprise information 204. Proceeding to block 534 "apply one or more filter algorithms to the log data to determine a set of entities that have accessed the data bucket, the one or more filter algorithms to remove noise from the log data or resolve permutations of accesses to the data bucket by a common entity" one or more filter algorithms may be applied to log data to determine a set of entities that have accessed a data bucket. Further, the set of filter algorithms may remove noise for the log data or resolve permutations of accesses to the data bucket by a common entity. For example, policy generator 210 may apply one or more filter algorithms 226 to log data 222 to determine the set of entities 230.

At block 536 "determine a set of one or more access characteristics for each entity in the set of entities based on the log data, each set of one or more access characteristics to include one or more access types to the data bucket requested by a corresponding entity" a set of one or more access characteristics for each entity in the set of entities may be identified based on the log data. Further, each set of access characteristics may include one or more access types to the data bucket requested by a corresponding entity. For instance, policy generator 110 may identify a set of one or more access characteristics 328 comprising one or more access types 370 for entity 330. In some such instances, entity 330 may be included in the set of entities 230 and policy generator 110 may repeat this process for each entity in the set of entities 230.

Continuing to block 538 "analyze the set of one or more access characteristics for each entity in the set of entities to determine a set of access requirements for each entity in the set of entities" the set of one or more access characteristics for each entity in the set of entities may be analyzed to determine a set of access requirements for each entity in the set of entities. For example, policy generator 110 may analyze the set of one or more access characteristics 328 comprising one or more access types 370 for entity 330 to determine the set of access requirements 332. In some such examples, entity 330 may be included in the set of entities 230 and policy generator 110 may repeat this process for each entity in the set of entities 230.

At block 540 "create first and second subsets of the set of entities based on the set of access requirements for each entity in the set of entities, the first subset of the set of entities to include one or more entities that require read-only access to the data bucket and the second subset of the set of entities to include one or more entities that require read-write access to the data bucket" first and second subsets of the set of entities may be created based on the set of access requirements for each entity in the set of entities. Further, the first subset of the set of entities may include one or more entities that require read-only access to the data bucket and the second subset of the set of entities may include one or more entities that require read-write access to the data bucket. For instance, policy generator 210 may create a first subset of entities 230 comprising read-only entities 234 and a second subset of entities 230 comprising read-write entities 236.

Proceeding to block 542 "generate an access policy for the data bucket based on the first and second subsets of the set of entities, the access policy to allow read-only access to the data bucket by the first subset of the set of entities, allow read-write access to the data bucket by the second subset of the set of entities, and prevent access to the data bucket by entities absent from the first and second subsets of the set of entities" an access policy for the data bucket may be generated based on the first and second subsets of the set of entities. For example, policy generator 210 may generate access policy 212 for data bucket 202 based on read-only entities 234 and read-write entities 236. In some such examples, access policy 212 may allow read-only access to data bucket 202 for read-only entities 234, read-write access to data bucket 202 for read-write entities 236, and prevent access to the data bucket 202 by entities absent from the read-only entities 234 and read-write entities 236.

FIG. 5C illustrates one embodiment of a logic flow 500C, which may be representative of operations that may be executed in various embodiments in conjunction with techniques for generating updating, and/or validating one or more aspects of an access policy for a data bucket. The logic flow 500C may be representative of some or all of the operations that may be executed by one or more components/devices/environments described herein, such as policy generator 110, filter algorithm(s) 226, and/or filter algorithm(s) 326. The embodiments are not limited in this context.

In the illustrated embodiments, logic flow 500C may begin at block 562 "identifying log data for a data bucket, the log data comprising access records for the data bucket and the data bucket comprising enterprise information" log data for a data bucket comprising enterprise information may be identified that includes access records for the data bucket. For example, policy generator 210 may identify log data 222 comprising access records 224 for data bucket 202 with enterprise information 204. Proceeding to block 564 "applying one or more filter algorithms to the log data to determine a set of entities that have accessed the data bucket" one or more filter algorithms may be applied to log data to determine a set of entities that have accessed a data bucket. For example, policy generator 210 may apply one or more filter algorithms 226 to log data 222 to determine the set of entities 230.

At block 566 "determining a set of one or more access characteristics for each entity in the set of entities based on the log data, each set of one or more access characteristics to include one or more access types to the data bucket requested by a corresponding entity" a set of one or more access characteristics for each entity in the set of entities may be identified based on the log data. Further, each set of access characteristics may include one or more access types to the data bucket requested by a corresponding entity. For instance, policy generator 110 may identify a set of one or more access characteristics 328 comprising one or more access types 370 for entity 330. In some such instances, entity 330 may be included in the set of entities 230 and policy generator 110 may repeat this process for each entity in the set of entities 230.

Continuing to block 568 "analyzing the set of one or more access characteristics for each entity in the set of entities to determine a set of access requirements for each entity in the set of entities" the set of one or more access characteristics for each entity in the set of entities may be analyzed to determine a set of access requirements for each entity in the set of entities. For example, policy generator 110 may analyze the set of one or more access characteristics 328 comprising one or more access types 370 for entity 330 to determine the set of access requirements 332. In some such examples, entity 330 may be included in the set of entities 230 and policy generator 110 may repeat this process for each entity in the set of entities 230.

At block 570 "creating first and second subsets of the set of entities based on the set of access requirements for each entity in the set of entities, the first subset of the set of entities to include one or more entities that require read-only access to the data bucket and the second subset of the set of entities to include one or more entities that require read-write access to the data bucket" first and second subsets of the set of entities may be created based on the set of access requirements for each entity in the set of entities. Further, the first subset of the set of entities may include one or more entities that require read-only access to the data bucket and the second subset of the set of entities may include one or more entities that require read-write access to the data bucket. For instance, policy generator 210 may create a first subset of entities 230 comprising read-only entities 234 and a second subset of entities 230 comprising read-write entities 236.

Proceeding to block 572 "generating an access policy for the data bucket based on the first and second subsets of the set of entities, the access policy to allow read-only access to the data bucket by the first subset of the set of entities, allow read-write access to the data bucket by the second subset of the set of entities, and prevent access to the data bucket by entities absent from the first and second subsets of the set of entities" an access policy for the data bucket may be generated based on the first and second subsets of the set of entities. For example, policy generator 210 may generate access policy 212 for data bucket 202 based on read-only entities 234 and read-write entities 236. In some such examples, access policy 212 may allow read-only access to data bucket 202 for read-only entities 234, read-write access to data bucket 202 for read-write entities 236, and prevent access to the data bucket 202 by entities absent from the read-only entities 234 and read-write entities 236.

Figure 6:
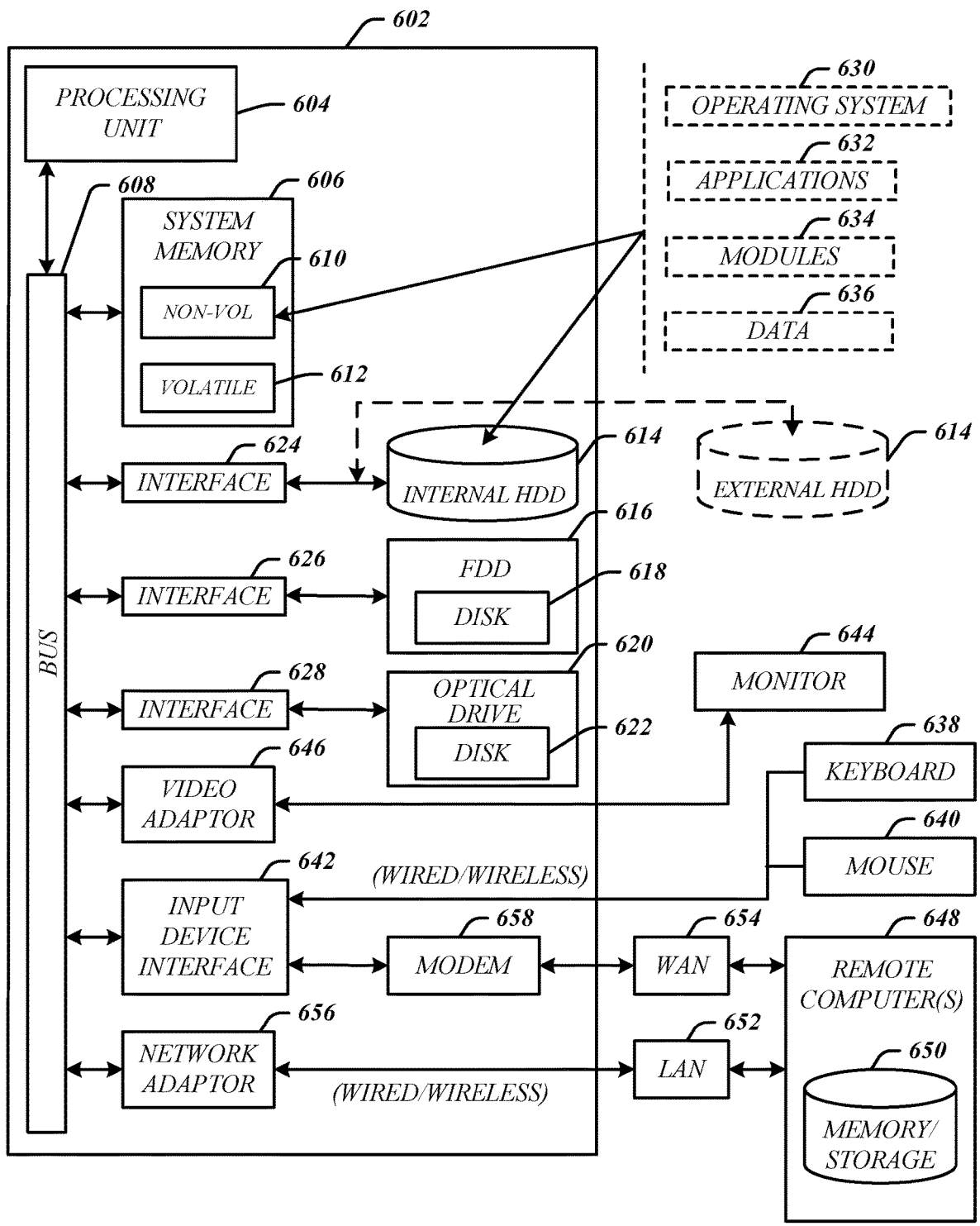
FIG. 6 illustrates exemplary aspects of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of one or more components described herein. In some embodiments, computing architecture 600 may be representative, for example, of a computing device that implements or utilizes one or more portions of components and/or techniques described herein, such as policy generator 110, policy generator 210, filter algorithm(s) 226, and/or filter algorithm(s) 326. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. In some embodiments, system memory 606 may include main memory. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include or implement, for example, the various techniques, applications, and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608 but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more interactions described herein may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
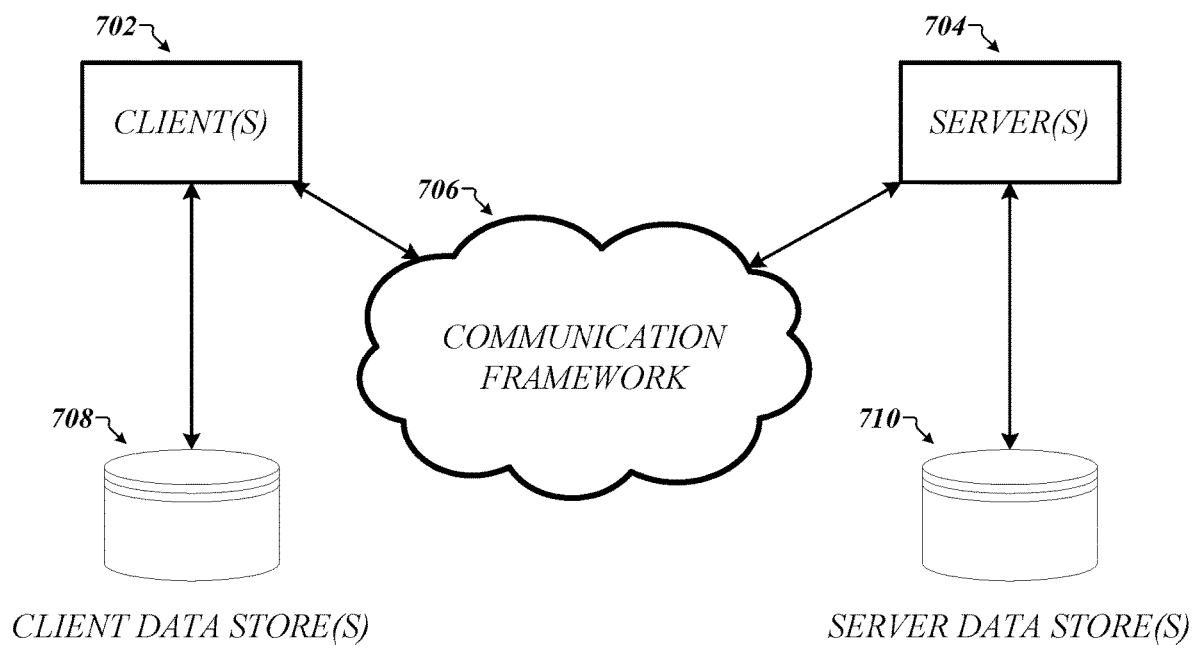
FIG. 7 illustrates exemplary aspects of a communications architecture according to one or more embodiments described herein.

FIG. 7 illustrates a block diagram of an exemplary communications architecture 700 suitable for implementing various techniques and/or embodiments as previously described, such as policy generator 110, policy generator 210, filter algorithm(s) 226, and/or filter algorithm(s) 326. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described herein. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. A computer-implemented method, comprising:
   determining a plurality of entities that have accessed a data bucket by removing noise from an access log for the data bucket or resolving permutations of accesses to the data bucket by a common entity, the access log comprising access records for the data bucket;
   determining a respective access type to the data bucket for each entity of the plurality of entities based on the access log;
   determining, based on the access types, a respective access requirement for each entity of the plurality of entities;
   creating a read-only subset and a read-write subset of the plurality of entities based on the access requirements; and
   generating an access policy for the data bucket based on the read-only and read-write subsets, the access policy to allow read-only access to the data bucket by entities in the read-only subset, allow read-write access to the data bucket by entities in the read-write subset, and prevent access to the data bucket by entities absent from the read-only and read-write subsets.

2. The method of claim 1, further comprising:
   applying a first filter algorithm to the access log to remove noise from the access log; and
   applying a second filter algorithm to the access log to resolve permutations of access to the data bucket by the common entity.

3. The method of claim 2, wherein the second filter algorithm determines the common entity based on an identifier portion of each access record.

4. The method of claim 3, wherein the identifier portion of each access record comprises an internet protocol (IP) address.

5. The method of claim 3, wherein the second filter algorithm determines the common entity based on a wildcard portion of the access records.

6. The method of claim 1, further comprising:
   receiving an updated access log for the data bucket;
   determining updated access types and updated access requirements for the data bucket based on the updated access log; and
   generating an updated access policy for the data bucked based on the updated access requirements for the data bucket.

7. The method of claim 1, further comprising:
   receiving the access log for the data bucket, the data bucket comprising enterprise information;
   identifying an access characteristic for each entity of the plurality of entities based on the access log; and
   analyzing the access characteristics to determine the access requirements for each entity of the plurality of entities.

8. A non-transitory computer-readable storage medium storing computer-readable instructions which when executed by a processor cause the processor to:
   determine a plurality of entities that have accessed a data bucket by removing noise from an access log for the data bucket or resolving permutations of accesses to the data bucket by a common entity, the access log comprising access records for the data bucket;
   determine a respective access type to the data bucket for each entity of the plurality of entities based on the access log;
   determine, based on the access types, a respective access requirement for each entity of the plurality of entities;
   create a read-only subset and a read-write subset of the plurality of entities based on the access requirements; and
   generate an access policy for the data bucket based on the read-only and read-write subsets, the access policy to allow read-only access to the data bucket by entities in the read-only subset, allow read-write access to the data bucket by entities in the read-write subset, and prevent access to the data bucket by entities absent from the read-only and read-write subsets.

9. The non-transitory computer-readable storage medium of claim 8, storing computer-readable instructions which when executed by the processor cause the processor to:
   apply a first filter algorithm to the access log to remove noise from the access log; and
   apply a second filter algorithm to the access log to resolve permutations of access to the data bucket by the common entity.

10. The non-transitory computer-readable storage medium of claim 9, wherein the second filter algorithm determines the common entity based on an identifier portion of each access record.

11. The non-transitory computer-readable storage medium of claim 10, wherein the identifier portion of each access record comprises an internet protocol (IP) address.

12. The non-transitory computer-readable storage medium of claim 10, wherein the second filter algorithm determines the common entity based on a wildcard portion of the access records.

13. The non-transitory computer-readable storage medium of claim 8, storing computer-readable instructions which when executed by the processor cause the processor to:
  receive an updated access log for the data bucket;
  determine updated access types and updated access requirements for the data bucket based on the updated access log; and
  generate an updated access policy for the data bucked based on the updated access requirements for the data bucket.

14. The non-transitory computer-readable storage medium of claim 8, storing computer-readable instructions which when executed by the processor cause the processor to:
  receive the access log for the data bucket, the data bucket comprising enterprise information;
  identify an access characteristic for each entity of the plurality of entities based on the access log; and
  analyze the access characteristics to determine the access requirements for each entity of the plurality of entities.

15. A system, comprising:
  a processor; and
  a memory storing instructions which when executed by the processor cause the processor to:
    determine a plurality of entities that have accessed a data bucket by removing noise from an access log for the data bucket or resolving permutations of accesses to the data bucket by a common entity, the access log comprising access records for the data bucket;
    determine a respective access type to the data bucket for each entity of the plurality of entities based on the access log;
    determine, based on the access types, a respective access requirement for each entity of the plurality of entities;
    create a read-only subset and a read-write subset of the plurality of entities based on the access requirements; and
    generate an access policy for the data bucket based on the read-only and read-write subsets, the access policy to allow read-only access to the data bucket by entities in the read-only subset, allow read-write access to the data bucket by entities in the read-write subset, and prevent access to the data bucket by entities absent from the read-only and read-write subsets.

16. The system of claim 15, the memory storing instructions which when executed by the processor cause the processor to:
  apply a first filter algorithm to the access log to remove noise from the access log; and
  apply a second filter algorithm to the access log to resolve permutations of access to the data bucket by the common entity.

17. The system of claim 16, wherein the second filter algorithm determines the common entity based on an identifier portion of each access record, wherein the identifier portion of each access record comprises an internet protocol (IP) address.

18. The system of claim 17, wherein the second filter algorithm further determines the common entity based on a wildcard portion of the access records.

19. The system of claim 15, the memory storing instructions which when executed by the processor cause the processor to:
  receive a request from a first entity to access the data bucket;
  determine that the first entity is absent from the read-only and read-write subsets; and
  restrict access to the data bucket by the first entity based on the first entity being absent from the read-only and read-write subsets.

20. The system of claim 15, the memory storing instructions which when executed by the processor cause the processor to:
  receive the access log for the data bucket, the data bucket comprising enterprise information;
  identify an access characteristic for each entity of the plurality of entities based on the access log; and
  analyze the access characteristics to determine the access requirements for each entity of the plurality of entities.

* * * * *